US011113731B2

(12) United States Patent
Chow et al.

(10) Patent No.: US 11,113,731 B2
(45) Date of Patent: *Sep. 7, 2021

(54) SYSTEMS AND METHODS FOR CUSTOMER VALUATION AND MERCHANT BIDDING

(71) Applicant: eBay Inc., San Jose, CA (US)

(72) Inventors: Jing-Ta Chow, Boston, MA (US); Michael Macasek, Cambridge, MA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,910

(22) Filed: Oct. 1, 2019

(65) Prior Publication Data

US 2020/0034890 A1 Jan. 30, 2020

Related U.S. Application Data

(63) Continuation of application No. 13/706,101, filed on Dec. 5, 2012, now Pat. No. 10,460,354.

(51) Int. Cl.
G06Q 30/00 (2012.01)
G06Q 30/02 (2012.01)

(52) U.S. Cl.
CPC ......... G06Q 30/0275 (2013.01); G06Q 30/02 (2013.01)

(58) Field of Classification Search
None
See application file for complete search history.

(56) References Cited

U.S. PATENT DOCUMENTS

| 7,848,765 | B2 | 12/2010 | Phillips et al. |
| 8,463,295 | B1 | 6/2013 | Caralis et al. |
| 10,460,354 | B2 | 10/2019 | Chow et al. |
| 2006/0200432 | A1 | 9/2006 | Flinn et al. |
| 2009/0298483 | A1 | 12/2009 | Bratu et al. |
| 2011/0010364 | A1 | 1/2011 | Ahtisaari et al. |
| 2011/0066479 | A1* | 3/2011 | Benson ............ G06Q 20/12 705/14.4 |

(Continued)

FOREIGN PATENT DOCUMENTS

WO 2013/052936 A1 4/2013

OTHER PUBLICATIONS

Calderoni et al., "Location-aware Mobile Services for a Smart City: Design, Implementation and Deployment", Dec. 2012, Journal of Theoretical and Applied Electronic Commerce Research, vol. 7, Issue 3, pp. 74-87 (Year: 2012).*

(Continued)

Primary Examiner — Naresh Vig
(74) Attorney, Agent, or Firm — Schwegman Lundberg & Woessner, P.A.

(57) ABSTRACT

A mediator system, which serves as a conduit between a customer and merchants, includes customer profile data. The mediator system analyzes the customer profile data, and assigns an indication to a customer represented by the customer profile data. The mediator system then provides the indication to the merchants, and then receives bids from the merchants. The bids are for establishing a connection between the merchants and the customer. The mediator system provides to a portion of the merchants, based on the bids, a connection to the customer.

20 Claims, 11 Drawing Sheets

(56) References Cited

U.S. PATENT DOCUMENTS

| | | |
|---|---|---|
| 2011/0184945 A1 | 7/2011 | Das et al. |
| 2011/0282739 A1 | 11/2011 | Mashinsky et al. |
| 2011/0307478 A1 | 12/2011 | Pinckney et al. |
| 2012/0030034 A1* | 2/2012 | Knapp .................. G06Q 30/08 705/14.71 |
| 2012/0136855 A1 | 5/2012 | Ni et al. |
| 2012/0158508 A1* | 6/2012 | Kilroy .................... G06Q 30/08 705/14.58 |
| 2012/0233158 A1 | 9/2012 | Braginsky et al. |
| 2012/0245990 A1 | 9/2012 | Agarwal |
| 2012/0271717 A1 | 10/2012 | Postrel |
| 2013/0024471 A1 | 1/2013 | Mitrovic |
| 2013/0060632 A1 | 3/2013 | Gadhia et al. |
| 2014/0156420 A1 | 6/2014 | Chow et al. |

OTHER PUBLICATIONS

Upkar Varshney, "Location Management for Mobile Commerce Applications in Wireless Internet Environment", Aug. 3, 2003, ACM Transactions on Internet Technology, vol. 3, No. 3, pp. 236-255 (Year: 2003).*
Definition of "Indication" in Oxford Dictionary, available at http://www.oxforddictionaries.com/us/definition/american_english/indication, accessed on Nov. 25, 2019, 4 pages.
Advisory Action received for U.S. Appl. No. 13/706,101, dated Jan. 29, 2018, 4 pages.
Appeal Brief filed for U.S. Appl. No. 13/706,101, mailed on Mar. 5, 2019, 37 pages.
Applicant Initiated Interview Summary received for U.S. Appl. No. 13/706,101, dated Aug. 1, 2016, 4 pages.
Applicant Initiated Interview Summary received for U.S. Appl. No. 13/706,101, dated Aug. 10, 2015, 4 pages.
Applicant Initiated Interview Summary received for U.S. Appl. No. 13/706,101, dated Feb. 25, 2016, 4 pages.
Applicant Initiated Interview Summary received for U.S. Appl. No. 13/706,101, dated Jul. 18, 2018, 2 pages.
Applicant Interview Summary received for U.S. Appl. No. 13/706,101, dated Aug. 4, 2014, 3 pages.
Final Office Action received for U.S. Appl. No. 13/706,101, dated Jul. 20, 2015, 29 pages.
Final Office Action received for U.S. Appl. No. 13/706,101, dated Jun. 2, 2016, 24 pages.
Final Office Action received for U.S. Appl. No. 13/706,101, dated Nov. 7, 2017, 24 pages.
Final Office Action received for U.S. Appl. No. 13/706,101, dated Oct. 18, 2018, 19 pages.
Non-Final Office Action received for U.S. Appl. No. 13/706,101, dated Dec. 18, 2014, 22 pages.
Non-Final Office Action received for U.S. Appl. No. 13/706,101, dated Jan. 18, 2017, 24 pages.
Non-Final Office Action received for U.S. Appl. No. 13/706,101, dated May 8, 2014, 32 pages.
Non-Final Office Action received for U.S. Appl. No. 13/706,101, dated Nov. 19, 2015, 25 pages.
Non-Final Office Action received for U.S. Appl. No. 13/706,101, dated May 24, 2018, 16 pages.
Notice of Allowance received for U.S. Appl. No. 13/706,101, dated Jun. 19, 2019, 16 pages.
Response to Final Office Action & Advisory Action filed on Apr. 5, 2018, for U.S. Appl. No. 13/706,101, dated Nov. 7, 2017 & Jan. 29, 2018, 29 pages.
Response to Final Office Action filed on Jan. 8, 2018, for U.S. Appl. No. 13/706,101, dated Nov. 7, 2017, 17 pages.
Response to Final Office Action filed on Oct. 20, 2015, for U.S. Appl. No. 13/706,101, dated Jul. 20, 2015, 21 pages.
Response to Non-Final Office Action filed on Aug. 21, 2014, for U.S. Appl. No. 13/706,101, dated May 8, 2014, 14 pages.
Response to Non-Final Office Action filed on Aug. 21, 2018, for U.S. Appl. No. 13/706,101, dated May 24, 2018, 21 pages.
Response to Non-Final Office Action filed on Feb. 19, 2016, for U.S. Appl. No. 13/706,101, dated Nov. 19, 2015, 21 pages.
Response to Non-Final Office Action filed on Jul. 18, 2017, for U.S. Appl. No. 13/706,101, dated Jan. 18, 2017, 23 pages.
Response to Non-Final Office Action filed on Mar. 18, 2015, for U.S. Appl. No. 13/706,101, dated Dec. 18, 2014, 26 pages.
Response to Non-Final Office Action filed on Oct. 7, 2016, for U.S. Appl. No. 13/706,101, dated Jun. 2, 2016, 19 pages.
Biddulph, "Place Graphs Are the New Social Graphs", Retrieved from the internet URL:<https://www.slideshare.net/mattb/place-graphs-are-the-new-social-graphs>, Sep. 21, 2011, 4 pages.

* cited by examiner

| VENUE | FEATURES | | | | | | | | | | |
|---|---|---|---|---|---|---|---|---|---|---|---|
| | 1 | 2 | 3 | 4 | 5 | 6 | 7 | 8 | 9 | 10 | ... | N |
| PLACE 1 | 0.23 | -0.4 | 0.3 | 0.01 | 0.8 | 0.4 | 0.45 | 0.2 | 0.9 | -0.3 | | 0.5 |
| PLACE 2 | 0.3 | 0.09 | 0.12 | -0.6 | 0.76 | 0.2 | -0.7 | 0.7 | 0.3 | -0.7 | | 0.9 |
| PLACE 3 | -0.6 | 0.6 | 0.3 | 0.69 | 0.2 | -0.87 | 0.65 | 0.5 | -0.7 | 0.3 | | 0.12 |
| ... | ... | ... | ... | ... | ... | ... | ... | ... | ... | ... | | ... |
| PLACE N | -0.98 | 0.12 | 0.43 | 0.76 | 0.49 | 0.27 | -0.076 | 0.79 | 0.31 | 0.16 | | 0.63 |

SYSTEMS AND METHODS FOR CUSTOMER VALUATION AND MERCHANT BIDDING

CROSS REFERENCE TO RELATED APPLICATIONS

This application is a continuation of and claims priority to U.S. patent application Ser. No. 13/706,101, filed Dec. 5, 2012, and entitled "Systems and Methods for Customer Valuation and Merchant Bidding." The contents of this prior application are considered part of this application, and is hereby incorporated by reference in their entirety.

TECHNICAL FIELD

This application relates generally to data processing within a network-based customer valuation and merchant bidding system over a distributed network, and more specifically to systems and methods for determining the value of a customer to a merchant based on customer profile data, accepting bids from merchants based on the value of the customer, and providing a merchant with a connection to the customer based on the bids.

BACKGROUND

The explosion of information available over network-based systems, such as the Internet, can overwhelm a business that is attempting to decide which customers or segments of the customer population to approach and/or contact regarding advertising or promotions. For example, a business that is looking to provide coupons or other promotions to potential customers may provide such coupons or promotions to the potential customers via a mass mailing, either paper-based or electronic-based. However, such a mass mailing is not targeted at all, and many such coupons or promotions will land in the mailboxes of persons who have no intention of purchasing the business's products or services, or have no intention of ever traveling to the area in which the business is located.

BRIEF DESCRIPTION OF THE DRAWINGS

Some embodiments are illustrated by way of example and not limitation in the figures of the accompanying drawings in which.

DEFINITIONS

Figure 1:
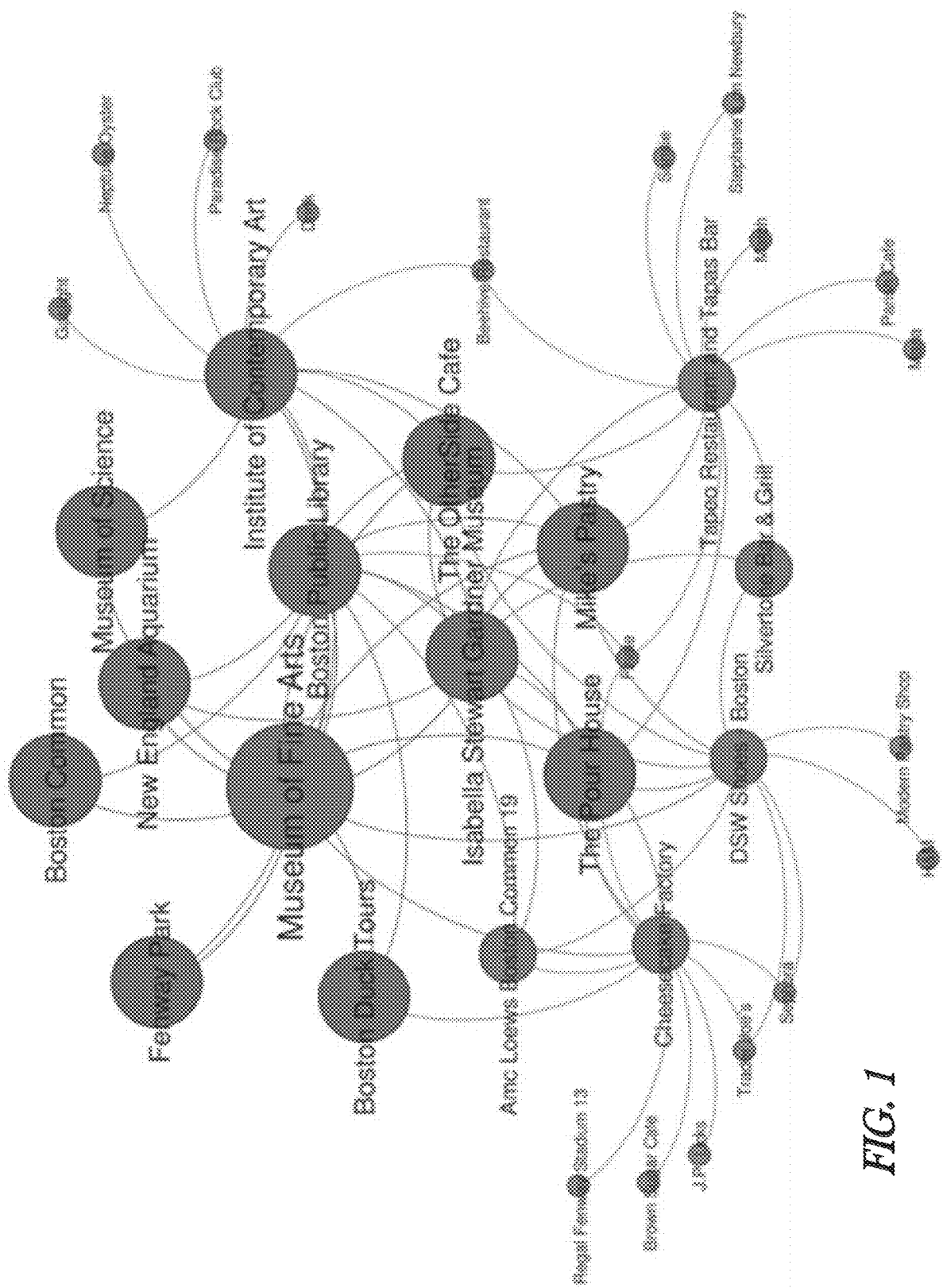
FIG. 1 is a relationship diagram illustrating a simple place graph, according to an example embodiment.

Place or Venue—For the purposes of this specification and the associated claims, the terms "place" and "venue" are used interchangeably to reference physical locations, such as a restaurant, theater, stadium, or place of business, among others. A place or venue will have various attributes or features, such as a physical location, category, and hours of operation, among others. The place or venue can also be categorized into multiple different categories, such as a restaurant or an Italian restaurant.

Location—For the purposes of this specification and the associated claims, the term "location" is used to refer to a geographic location, such as a longitude/latitude combination or a street address.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

User and customer—For the purposes of this specification and the appended claims, the terms "user" and "customer" are used interchangeably, and general refer to any person who uses a mobile communications device, accesses a merchant website, searches the Internet, or engages in any other electronic interaction that can trigger the calculation of a customer valuation.

DETAILED DESCRIPTION

Example systems and methods for providing customer valuation and receiving merchant bidding on access or connections to such customers are described. In an embodiment, such customer valuation and merchant bidding occur in real time or near real time. The systems and methods for providing the customer valuation and receiving the merchant bidding, in some example embodiments, may provide the valuation and bidding based on present and/or past behavior of a customer or other user interacting with a network-based system, such as a network-based location-aware system, or it could be based on a customer or other user accessing the Internet, and in particular, a web-site of a merchant. In the following description, for purposes of explanation, numerous specific details are set forth in order to provide a thorough understanding of example embodiments. It will be evident, however, to one skilled in the art that the present invention may be practiced without these specific details. It will also be evident that customer valuation and merchant bidding are not limited to the examples provided herein, and may include other scenarios not specifically discussed.

Before discussing the details of an example customer valuation and merchant bidding system, it is worth noting that the advent of Internet-connected smartphones, such as the iPhone™ (from Apple, Inc. of Cupertino, Calif.), which typically have location determination capabilities, has provided a network-based location-aware system that makes vast amounts of information available via the Internet available anywhere. Such network-based location-aware systems can further include recommendation systems, which recommend a product or service to a customer or user based on one or more of the customer's location and customer data.

Traditional recommendation systems use some form of collaborative filtering to reduce the volume of information found through simple keyword or natural language searching. Two different basic types of collaborative filtering are typically employed by recommendation systems, user-based or item-based (or target-based). User-based collaborative filtering focuses on grouping like user behavior. Item-based recommendation systems focus on grouping similar items. Item-based recommendations using collaborative filtering can be used by commerce sites to provide recommendations based on the purchase history of users who bought similar products (e.g., users who bought X also bought Y and Z). Item-based recommendations can also be applied to things like restaurants or entertainment venues. However, collaborative filtering is limited, especially when location is added to the recommendation matrix. In addition to making product and service recommendations, similar systems and methods can be used to evaluate a user as a potential customer. In an embodiment, as will be explained in detail below, aspects of such network-based location-aware systems can be used in a customer valuation and merchant bidding system.

In accordance with an example embodiment, a network-based system can provide customer valuations (to merchants) and accept merchant bidding (based on those customer valuations, which is based on data within a customer profile database). In some embodiments, the customer's location is used in the valuation process. Specifically, in some examples, the user interacts with the network-based system via a mobile device, such as a smartphone, a tablet computing device, or Internet enabled personal digital assistant (PDA), among others. In an example, the network-based system can include a customer valuation sub-system capable of deriving a customer valuation and communicating the valuation to one or more merchants. The network-based system can further include a merchant bidding system, which solicits and receives bids from the merchants based on the valuation of the customer. The network-based system can further include a merchant-customer connection system, which provides a connection to a customer for one or more merchants based on the bids of the merchants. In an embodiment, the network-based system is offered, executed, and maintained by a mediator that serves as a conduit between the customer and the merchants. The network-based system can provide such merchant-customer connections to a customer's mobile communication device in real time or near real time. Producing real-time merchant-customer connections benefits from on-the-fly calculations, whereas in contrast pre-programmed (pre-compiled) valuations are not effective when both user profile data (e.g., preferences as well as explicit and implicit behaviors) and location data are used to generate the customer valuations and accept the merchant bidding.

In an embodiment of the customer valuation and merchant bidding system, the system considers that users typically only visit local establishments a couple times a week and also tend to visit the same locations more frequently. Thus, the customer valuation and merchant bidding system may benefit from using algorithms that go beyond simple collaborative filtering. In an example embodiment, a customer valuation and merchant bidding system can generate a graph of places, referred to herein as a place graph, to enable personalized valuations and merchant bidding. The place graph contains physical locations as nodes interconnected by inherent or user specific relationships (also referred to as features). FIG. 1 is a relationship diagram or graph illustrating a simple place graph for a specific user at a specific geographic location.

According to an example, a place graph can be generated from multiple inputs, including general information about the physical locations, user inputs, and data retrieved from a customer profile database. The general information about the physical locations can include location (e.g., longitude/latitude, street address, etc.), category (e.g., restaurant, bar, etc.), and reviews, among other things. The user inputs can include both implicit and explicit interactions with physical locations. The customer valuation and merchant bidding system can then use algorithms such as machine learning, similarity metrics, and predictive analytics to generate a place graph for a particular user in a particular location. The algorithms used by the customer valuation and merchant bidding system allow for real-time projection of a user's implicit and explicit interactions in one location to be projected onto a new location to produce customer valuations relevant to both the customer's demonstrated interests and the venues (e.g., restaurants, entertainment events, etc. . . . ) available in the new location, which are then used to place a value on the customer. In an example, projection of a customer's implicit and explicit interactions in one location to a new location includes filtering places in the new location through a spatial filtering mechanism (e.g., center point and radius).

The inputs used in certain example embodiments to place a value on the customer can include three general buckets: explicit interactions, implicit interactions, and place (location) information. Explicit interactions can include ratings, reviews, check-ins, saving places into an address book, or another explicit action taken by a customer or other user that can be positively interpreted to indicate a preference regarding a venue. That is, explicit interactions are inputs from users (potential customers for a merchant to bid on) that directly reveal the users' preferences and choices. Implicit interactions are passive byproducts of a user's searching, browsing, or interacting with a mobile application. For example, an implicit interaction can be recorded when a user clicks on an online detail page of a local venue, although it should be noted that merely clicking on a detail page for a venue does not positively identify the user's intent regarding the venue. In some cases, the user may read the detail page and decide that they do not like the venue (or are unlikely to like the venue). Notwithstanding, the customer valuation system may infer some interest in a venue based on a customer's or user's implicit interactions, especially when these implicit interactions are handled differently from explicit interactions by the valuation and bidding system. Finally, as noted above, the customer valuation and merchant bidding system uses place or venue information as an input to calculating a place graph.

Figure 2:
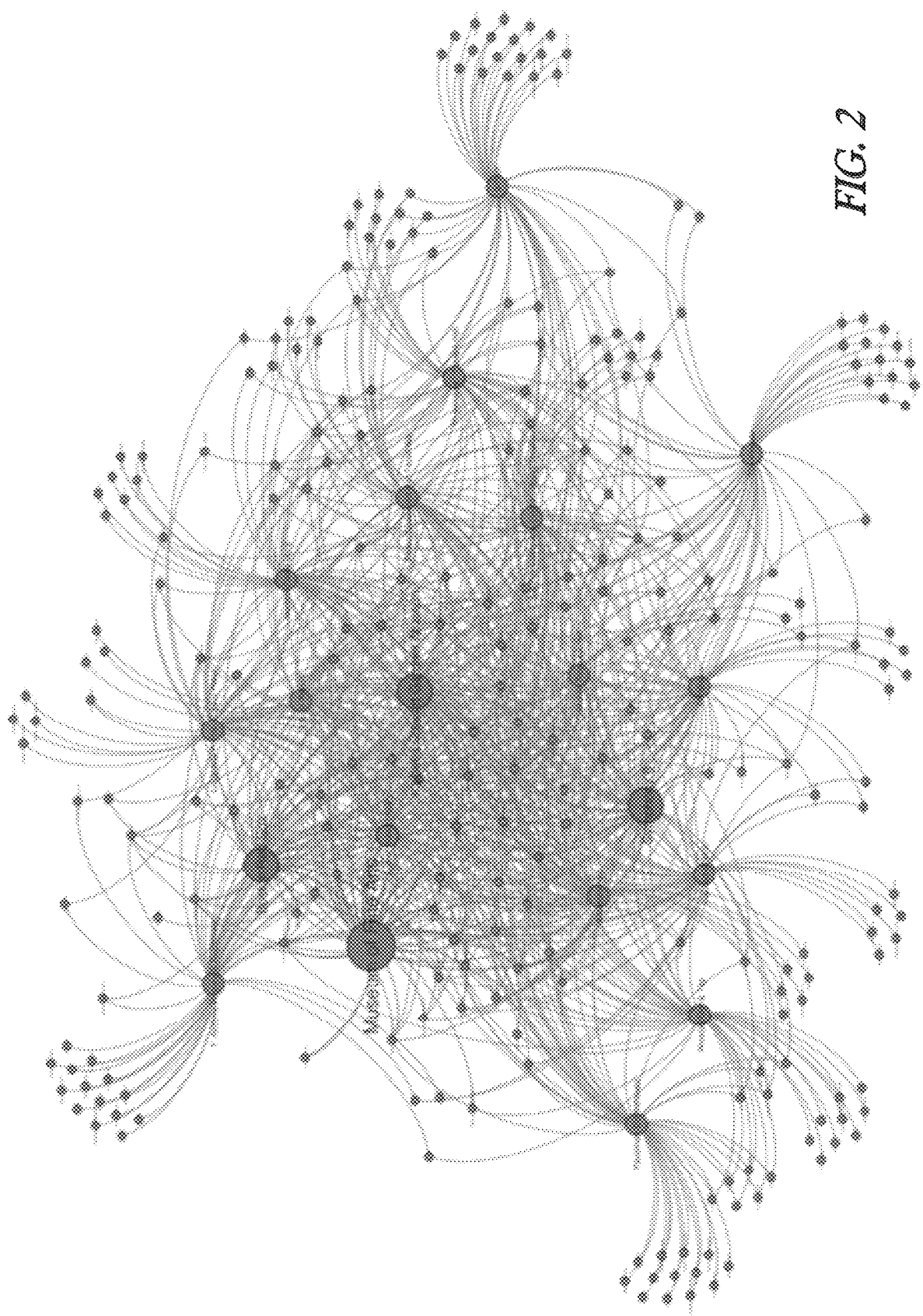
FIG. 2 is a relationship diagram illustrating a more detailed place graph, according to an example embodiment.

In an example, the customer valuation and merchant bidding system uses specialized indexing and retrieval algorithms that leverage mathematical techniques and machine learning to identify patterns and relationships for venues based on the inputs described above. Given the inputs discussed above, the dynamically generated output consists of multiple levels of relationships of places for a particular user. FIG. 2 is a relationship diagram illustrating a more detailed place graph, according to an example embodiment.

As illustrated by the place graph examples of FIG. 1 and FIG. 2, local places with similar features often end up related in a place graph (e.g., some sushi place will likely have other sushi places in the graph). In an example, the customer valuation and merchant bidding system uses algorithms, such as principal component analysis (PCA) and/or singular value decomposition (SVD), to extract features across a set of locations within a geographical area. This machine-based feature extraction can identify similarities between locations that are not readily apparent to users. For example, an extracted similarity feature might be something like "restaurants that service expensive food downtown and have award winning deserts." The features are often so arcane that it requires careful re-construction analyzing two machine-related locations to determine how the shared feature was developed. Thus, in these examples, this relationship (represented by the shared feature) is inferred, not implied-meaning these are the results of the mathematical algorithms that have been computed/inferred, and not directly or heuristically implied. In this example, dimensionality reduction can be applied to further the concept of inferring relationships between places (e.g., venues). These techniques enable an example customer valuation and merchant bidding engine to develop previously unknown connections among places, allowing for new personalized customer valuations to be determined and presented to merchants for bidding.

As mentioned above, explicit and implicit user interactions can be treated differently by the customer valuation and merchant bidding engine in developing a place graph. Although there sometimes appears to be a high correlation between implicit and explicit actions-between places that have been browsed and have been rated by a user-attempts to model explicit interactions from implicit interactions generally produces lower quality customer valuations. In an example, the quality of a valuation can be measured by a merchant acting upon a customer valuation (either explicitly or implicitly). For example, historical user interaction data demonstrates that trying to predict a user's rating for a particular place based on the number of times that user has viewed the detailed page of that place has not proven reliable. While hybrid models can be applied, most example embodiments use probabilistic similarity metrics to calculate relationships among places in a certain geographic area (e.g., neighborhood, city, or metro area).

Generating a personalized place graph can be a difficult undertaking. As mentioned above, user-place interactions are generally sparse and extremely sparse (or non-existent) in new geographic locations. To address the sparse data issue, the customer valuation and merchant bidding system can use dimensionality reduction and matrix factorization. In an example system, dimensionality reduction and matrix factorization are performed using the PCA and SVD algorithms mentioned above. By factorizing an original user-place-interaction matrix, the system can uncover hidden connections among places in different geographic locations based on user profile data and successfully build a place graph for new geographic locations (e.g., geographic locations where the user has limited or no explicit or implicit interactions with local places). In certain examples, the customer valuation and merchant bidding system can also leverage more traditional collaborative filtering techniques, particularly when a user initially starts using the recommendation system (e.g., cold start).

In an example, the customer valuation and merchant bidding system can create customer valuations for a new geographic location. As customers or users move around with their mobile devices going to different places throughout the day, merchants who would like to bid on those customers would like the customer valuations to be constantly and dynamically recalculated according to the places around the customer (e.g., current geographic location) as well as other factors such as time of day. Periodically calculating customer valuations offline may not produce the results desired by merchants looking to bid on mobile customers. In such instances, valuation calculations, merchant bid solicitations, and merchant bid acceptances may have to be performed in real-time and with the customer's or user's current location in context.

In an example, the customer valuation and merchant bidding system can employ rapid place graph node traversal to solve the real-time customer valuation and merchant bidding problem discussed above. The customer valuation and merchant bidding system discussed herein is capable of constantly recalculating customer valuations and updating a valuation based on a user's previous places (e.g., customer profile data) and relative to the customer's current location. As a result, the discussed customer valuation and merchant bidding system is an optimal solution for local discovery that takes mobile usability into account.

In an example, as potential customers or users interact with places (nodes within a place graph), the explicit and implicit interactions are mapped on a place graph (e.g., nodes and edges are updated). Paths can then be calculated within the place graph that reflect the user's local tastes (e.g., likes and dislikes). The paths can be referred to as taste paths. Based on these taste paths, the system can calculate and re-calculate a customer valuation.

As noted above, the customer valuation and merchant bidding system can use a hybrid model that takes into account information beyond a place graph, such as user profile information and social graph (e.g., social network connections). This additional information can be especially useful in a cold start scenario, where a user has not recorded many (or any) interactions either explicitly or implicitly.

Example Operating Environment

Figure 3:
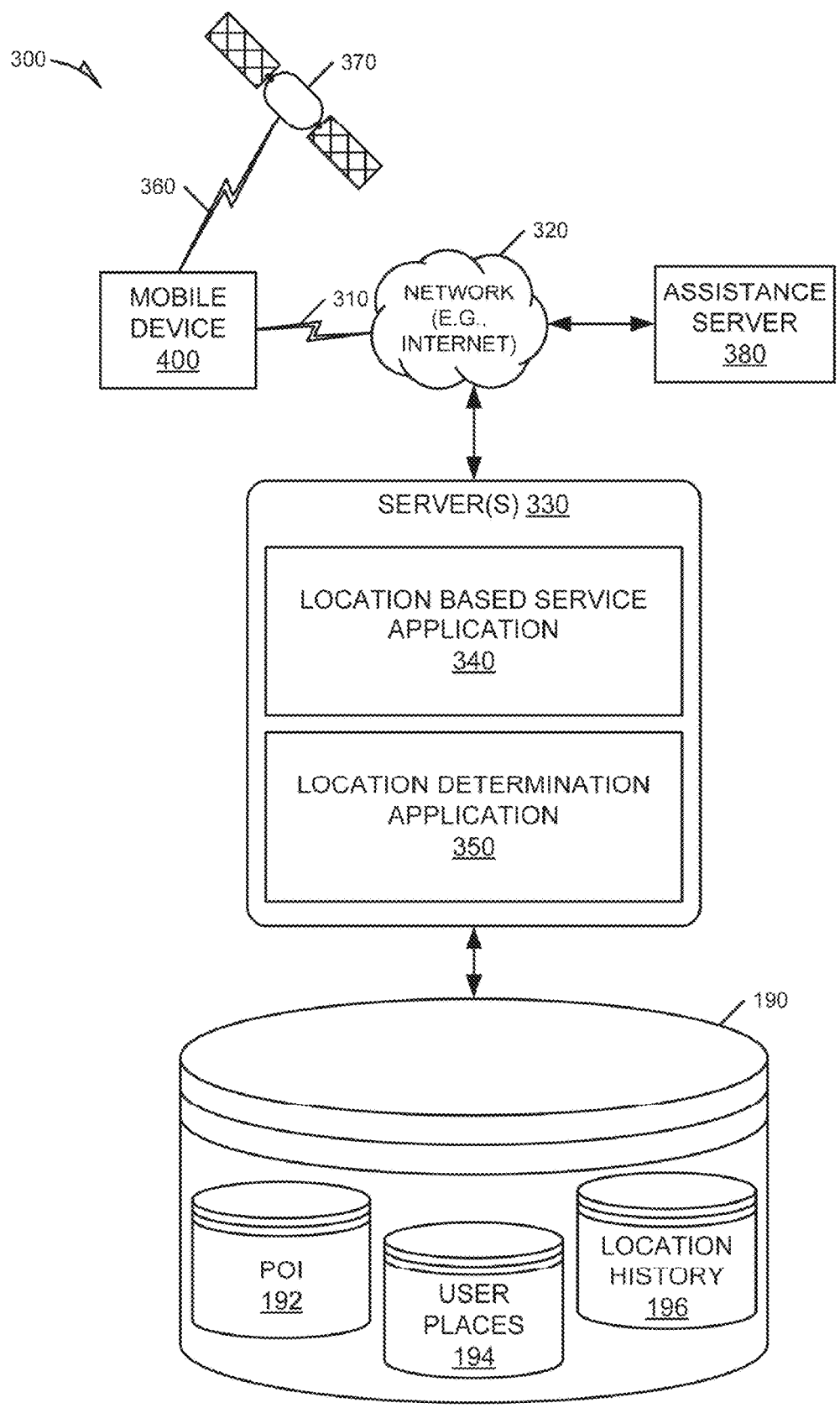
FIG. 3 is a block diagram illustrating an environment for operating a mobile device, according to an example embodiment.

FIG. 3 is a block diagram illustrating an environment 300 for operating a mobile device 400, according to an example embodiment. The mobile electronic device 400 may be any of a variety of types of devices, for example a cellular telephone, a personal digital assistant (PDA), a Personal Navigation Device (PND), a handheld computer, a tablet computer, a notebook computer, or other type of movable device. The device 400 may interface via a connection 310 with a communication network 320. Depending on the form of the mobile electronic device 400, any of a variety of types of connections 310 and communication networks 320 may be used. The device 400 may further interface with a satellite 370 via a link 360.

For example, the connection 310 may be Code Division Multiple Access (CDMA) connection, a Global System for Mobile communications (GSM) connection, or other type of cellular connection. Such connection 310 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology. When such technology is employed, the communication network 320 may include a cellular network that has a plurality of cell sites of overlapping geographic coverage, interconnected by cellular telephone exchanges. These cellular telephone exchanges may be coupled to a network backbone, for example, the public switched telephone network (PSTN), a packet-switched data network, or to other types of networks.

In another example, the connection 310 may be Wireless Fidelity (Wi-Fi, IEEE 802.11x type) connection, a Worldwide Interoperability for Microwave Access (WiMAX) connection, or another type of wireless data connection. In such an embodiment, the communication network 320 may include one or more wireless access points coupled to a local area network (LAN), a wide area network (WAN), the Internet, or other packet-switched data network.

In yet another example, the connection 310 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 330 may be coupled via interfaces to the communication network 320, for example, via wired or wireless interfaces. These servers 330 may be configured to provide various types of services to the mobile electronic device 400. For example, one or more servers 330 may execute location based service (LBS) applications 340, which interoperate with software executing on the device 400, to provide LBS's to a user. LBS's can use knowledge of the device's location, and/or the location of other devices, to provide location-specific information, recommendations, notifications, interactive capabilities, and/or other functionality to a user. Knowledge of the device's location, and/or the location of other devices, may be obtained through interoperation of the device 400 with a location determination application 350 executing on one or more of the servers 330. Location information may also be provided by the device 400, without use of a location determination application, such as application 350. In certain examples, the device 400 may have some limited location determination capabilities that are augmented by the location determination application 350. The servers are coupled to database 190, which includes point of interest files 192, user place files 194, and location history files 196.

Example Mobile Device

Figure 4:
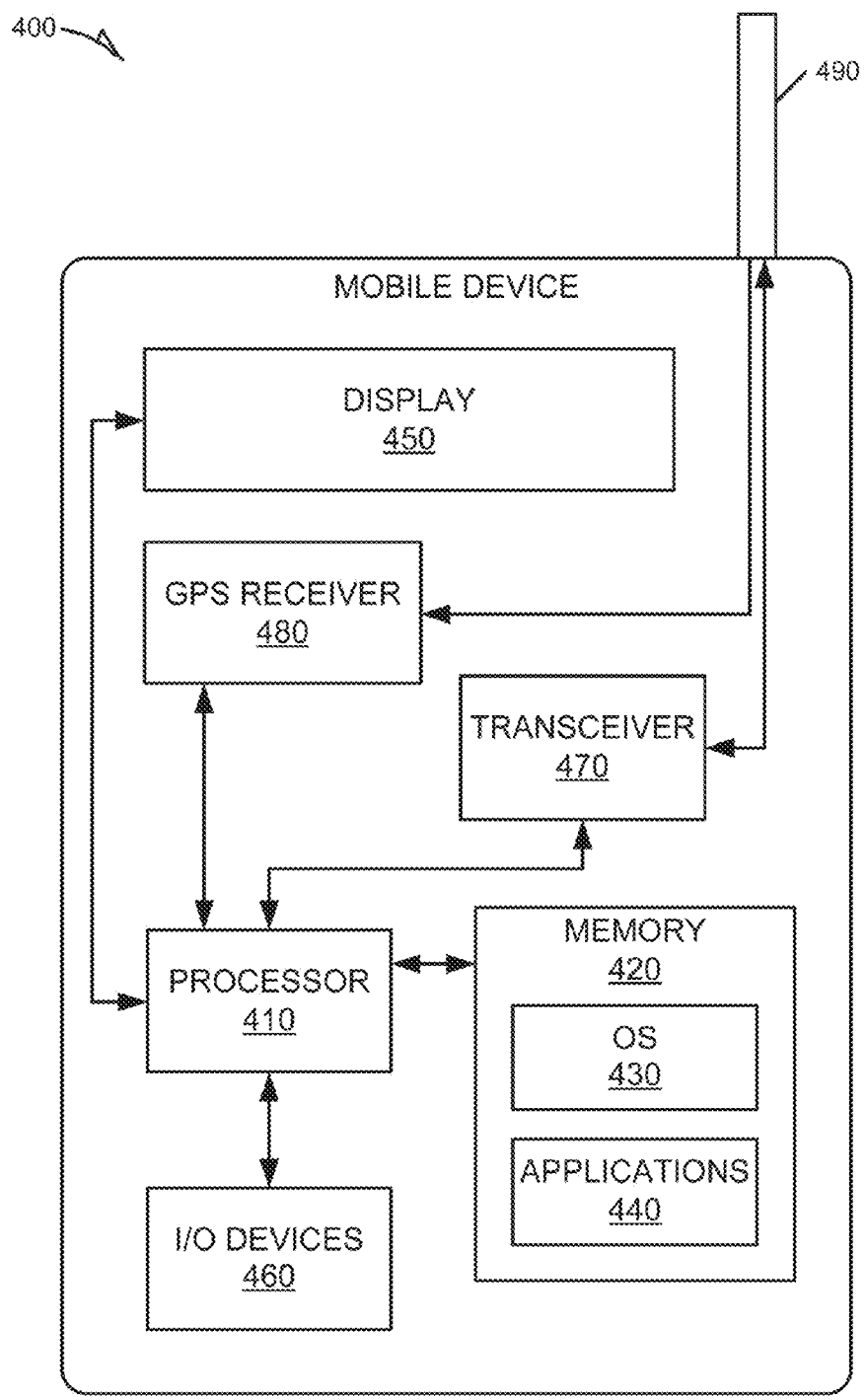
FIG. 4 is a block diagram illustrating a mobile device, according to an example embodiment.

FIG. 4 is a block diagram illustrating the mobile device 400, according to an example embodiment. The device 400 may include a processor 410. The processor 410 may be any of a variety of different types of commercially available processors suitable for mobile devices, for example, an XScale architecture microprocessor, a Microprocessor without Interlocked Pipeline Stages (MIPS) architecture processor, or another type of processor. A memory 420, such as a Random Access Memory (RAM), a Flash memory, or other type of memory, is typically accessible to the processor. The memory 420 may be adapted to store an operating system (OS) 430, as well as application programs 440, such as a mobile location enabled application that may provide LBS's to a user. The processor 410 may be coupled, either directly or via appropriate intermediary hardware, to a display 450 and to one or more input/output (I/O) devices 460, such as a keypad, a touch panel sensor, a microphone, etc. Similarly, in some embodiments, the processor 410 may be coupled to a transceiver 470 that interfaces with an antenna 490. The transceiver 470 may be configured to both transmit and receive cellular network signals, wireless data signals, or other types of signals via the antenna 490, depending on the nature of the device 400. In this manner, the connection 410 with the communication network 420 may be established. Further, in some configurations, a GPS receiver 480 may also make use of the antenna 490 to receive GPS signals.

Additional detail regarding providing and receiving location-based services can be found in U.S. Pat. No. 7,848,765, Titled "Location-Based Services," granted to Phillips et al. and assigned to Where, Inc. of Boston, Mass., which is hereby incorporated by reference.

Example Platform Architecture

Figure 5:
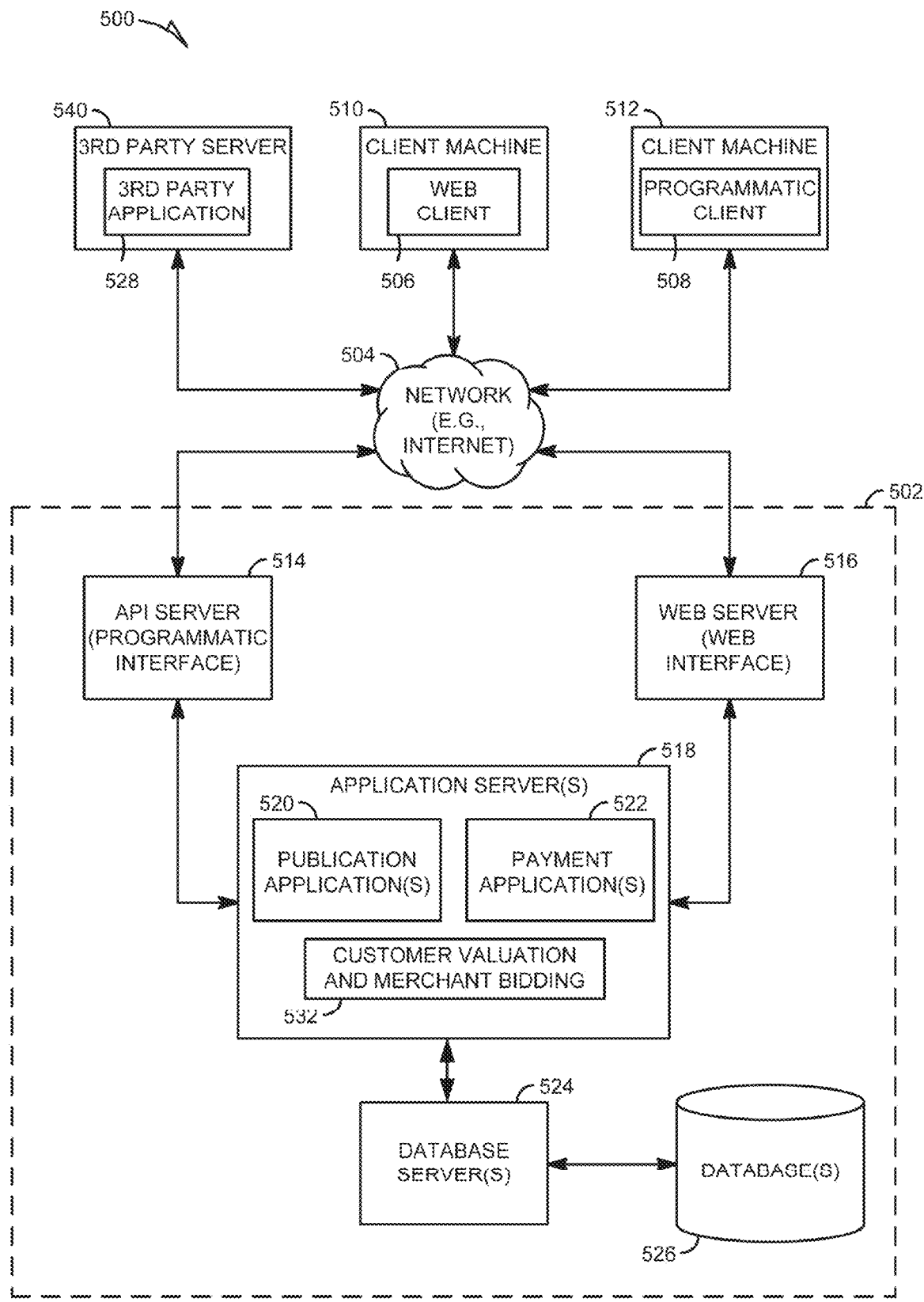
FIG. 5 is a block diagram illustrating a network-based system for delivering customer valuations and receiving merchant bidding, according to an example embodiment.

FIG. 5 is a block diagram illustrating a network-based system 500 for determining customer valuations, soliciting and receiving merchant bids based on the customer valuations, and delivering promotions and advertisements from the merchants to the customer. In an embodiment, the system operates in real time or near real-time. The block diagram depicting a client-server system 500, within which an example embodiment can be deployed is described. A networked system 502, in the example forms of a network-based customer valuation and merchant bidding, advertisement, or publication system, provides server-side functionality, via a network 504 (e.g., the Internet or Wide Area Network (WAN)) to one or more clients 510, 512. FIG. 5 illustrates, for example, a web client 506 (e.g., a browser, such as the Internet Explorer browser developed by Microsoft Corporation of Redmond, Wash. State), and a programmatic client 508 (e.g., WHERE smartphone application from Where, Inc. of Boston, Mass.) executing on respective client machines 510 and 512. In an example, the client machines 510 and 512 can be in the form of a mobile device, such as mobile device 400.

An Application Programming Interface (API) server 514 and a web server 516 are coupled to, and provide programmatic and web interfaces respectively to, one or more application servers 518. The application servers 518 host one or more publication applications 520 (in certain examples these can also include commerce applications, advertising applications, and marketplace applications, to name a few), payment applications 522, and a customer valuation and merchant bidding sub-system 532. The application servers 518 are, in turn, shown to be coupled to one or more database servers 524 that facilitate access to one or more databases 526. In some examples, the application server 518 can access the databases 526 directly without the need for a database server 524.

The publication applications 520 may provide a number of publication functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication applications 520. The payment application 522 may also be configured to present merchant promotions and/or recommendations, generated by the customer valuation and merchant bidding sub-system 532, to a user during checkout. The customer valuation and merchant bidding sub-system 532 may provide real-time customer valuation and merchant bidding to users of the networked system 502. The customer valuation and merchant bidding sub-system 532 can be configured to use all of the various communication mechanisms provided by the networked system 502 to present customer valuation and solicit and provide merchant bidding to users. While the publication applications 520, payment applications 522, and customer valuation and merchant bidding sub-system 532 are shown in FIG. 5 to all form part of the networked system 502, it will be appreciated that, in alternative embodiments, the payment applications 522 may form part of a payment service that is separate and distinct from the networked system 502.

Further, while the system 500 shown in FIG. 5 employs a client-server architecture, the present invention is of course not limited to such an architecture, and could equally well find application in a distributed, or peer-to-peer, architecture system, for example. The various publication applications 520, payment applications 522, and recommendation sub-system 532 could also be implemented as standalone software programs, which do not necessarily have networking capabilities.

The web client 506 accesses the various publication applications 520, payment applications 522, and customer valuation and merchant bidding sub-system 532 via the web interface supported by the web server 516. Similarly, the programmatic client 508 accesses the various services and functions provided by the publication applications, payment applications, and valuation/bidding servers 520, 522 and 532 via the programmatic interface provided by the API server 514. The programmatic client 508 may, for example, be a local recommendation smartphone application (e.g., the WHERE application developed by Where, Inc., of Boston, Mass.) to enable users to receive real-time location-aware merchant promotions on their smartphones leveraging user profile data and current location information provided by the smartphone.

FIG. 5 also illustrates a third party application 528, executing on a third party server machine 540, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502. Additionally, the third party website may provide merchant promotions for items or services available on the networked system 502 through the customer valuation and merchant bidding sub-system 532. Additionally, the application server 518 may access advertisement data via a third party system, such as the third party server 540.

Example Customer Valuation and Merchant Bidding Sub-System

Figure 6:
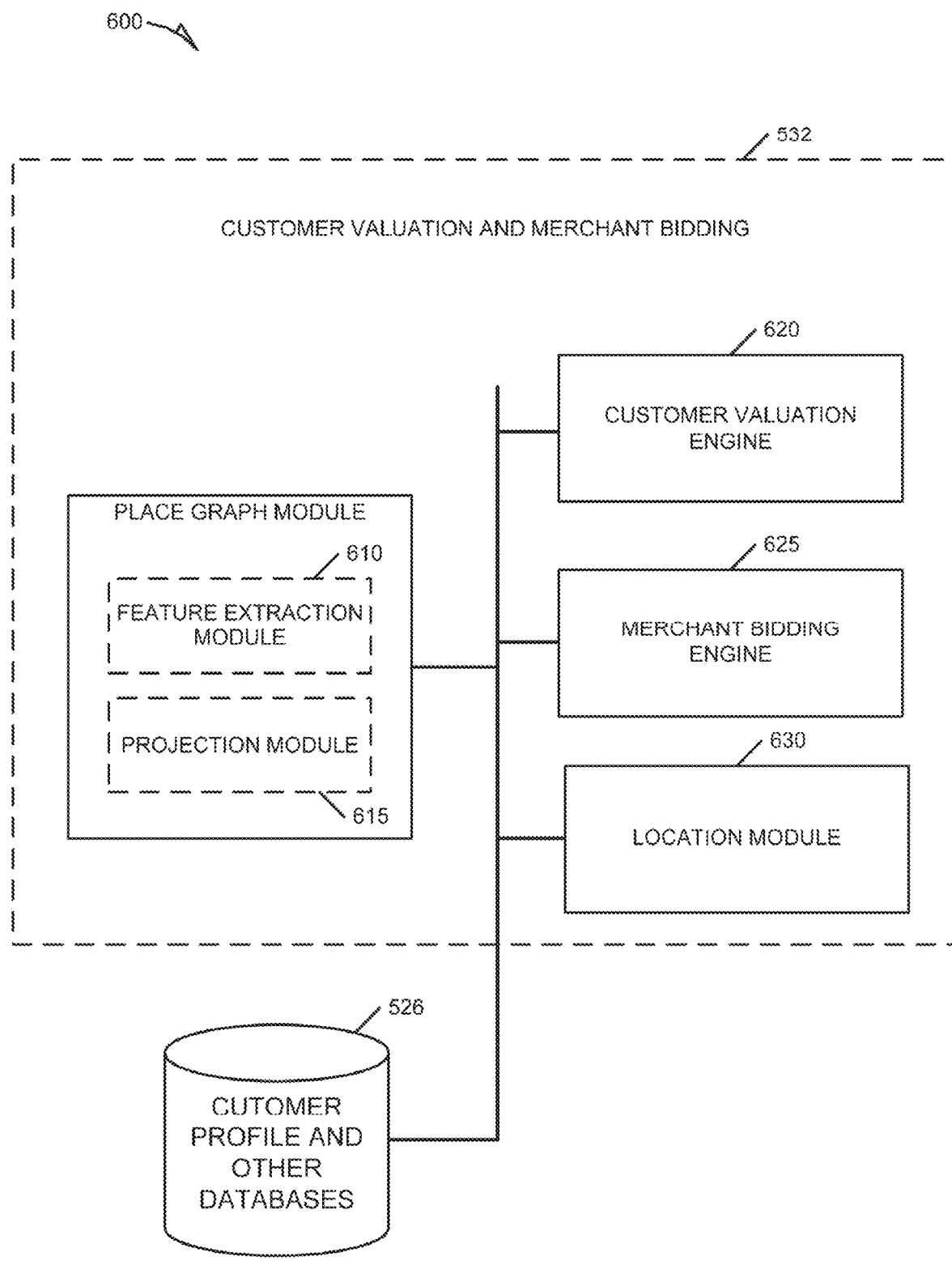
FIG. 6 is a block diagram illustrating an example customer valuation and merchant bidding sub-system capable of generating a valuation indication of a customer and receiving a bid on a customer from a merchant, according to an example embodiment.

FIG. 6 is a block diagram 600 illustrating an example customer valuation and merchant bidding sub-system 532 capable of generating customer valuations and soliciting and accepting merchant bidding, according to an example embodiment. In another example embodiment, the customer valuation and merchant bidding is performed in real-time or near real-time. In an example, the customer valuation and merchant bidding sub-system 532 can include a place graph module 605, a location module 630, a customer valuation engine 620, and a merchant bidding engine 625. In some examples, the place graph module 605 can include a feature extraction module 610 and a projection module 615. In this example, the customer valuation and merchant bidding sub-system 532 can access database customer profile and other databases 526 to store and/or retrieve user profile data as well as information about local places (also referred to as location data).

In an example, the place graph module 605 can generate a place graph for the current location based on user profile data and location data. In some examples, the location data can be provided by the location module 630. In certain examples, the place graph module 605 includes a feature extraction module 610 that can invoke algorithms, such as PCA and SVD, to extract a feature matrix for a first plurality of places that have interactions associated with them in the user profile data. The feature extraction module 610 can also use both explicit and implicit user interactions associated with the plurality of places to score each of the extracted features. See FIG. 9 for a table illustrating an example feature matrix for a plurality of places. The explicit and implicit user interaction data can be stored within the user profile data. The projection module 615 can project the feature matrix onto a second plurality of places provided by the location module 630. In some examples, the second plurality of places is derived from a different geographic location that does not necessarily include any places in common with the first plurality of places. In an example, the projection module 615 can use a spatial search (e.g., center point and radius) around a current location to filter places around a user based on the new places feature values. In this example, the filter will show only places that have feature values similar to the feature values within the feature matrix derived from the user profile data. Finally, the customer valuation engine 620 can use the output of the place graph module 605 to produce a customer valuation of a particular customer in a particular location. In certain examples, the customer valuation engine 620 maintains a list of recommended places for a particular customer in a particular location. The customer valuation and merchant bidding sub-system 532 can continually update the list of recommended places as the potential customer moves from location to location throughout the day.

Figure 7A:
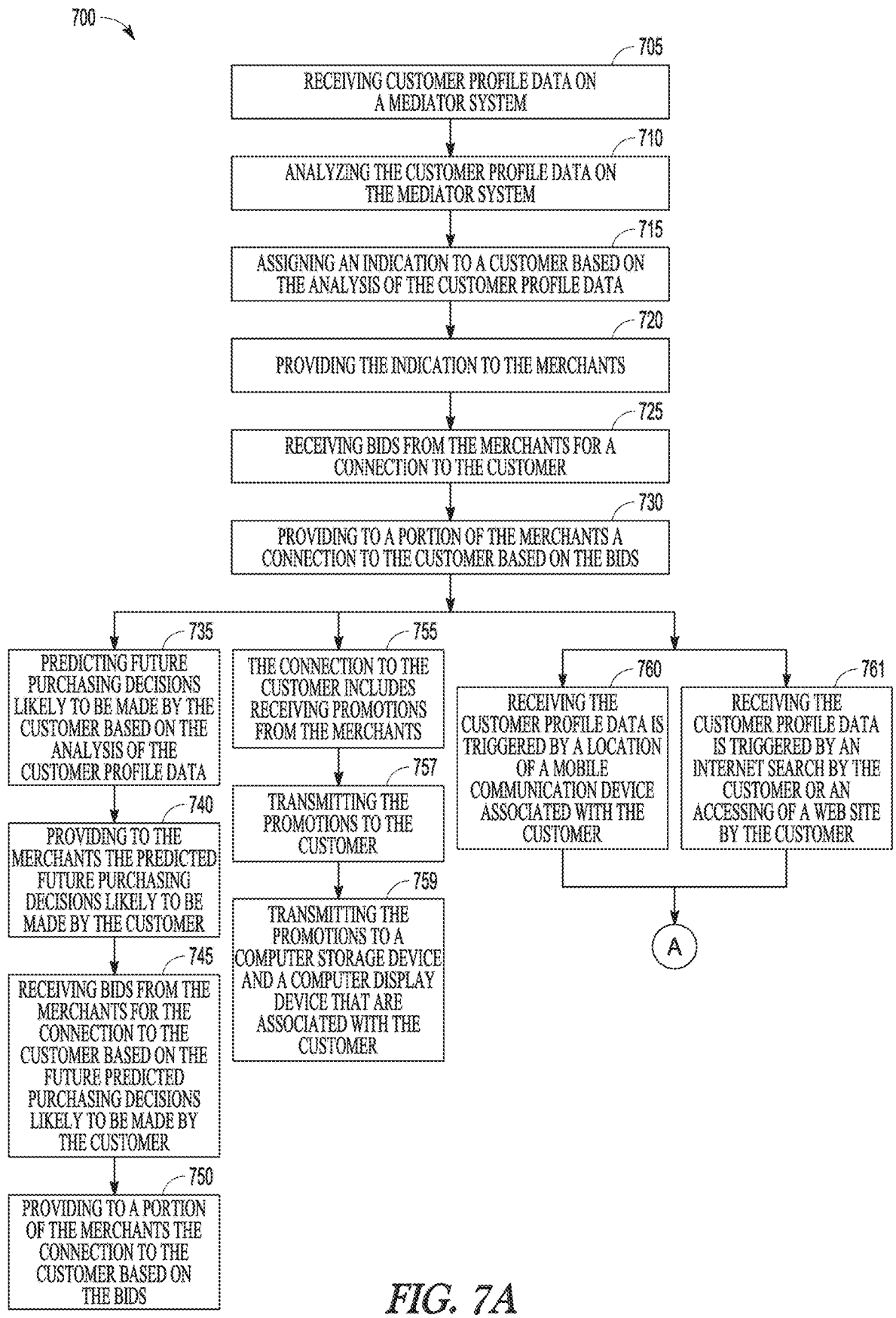
FIGS. 7A and 7B are a flowchart illustrating an example method for generating customer valuations, soliciting merchant bidding on customers, and providing to the merchants connections to the customers based on the bidding, according to an example embodiment.
Figure 7B:
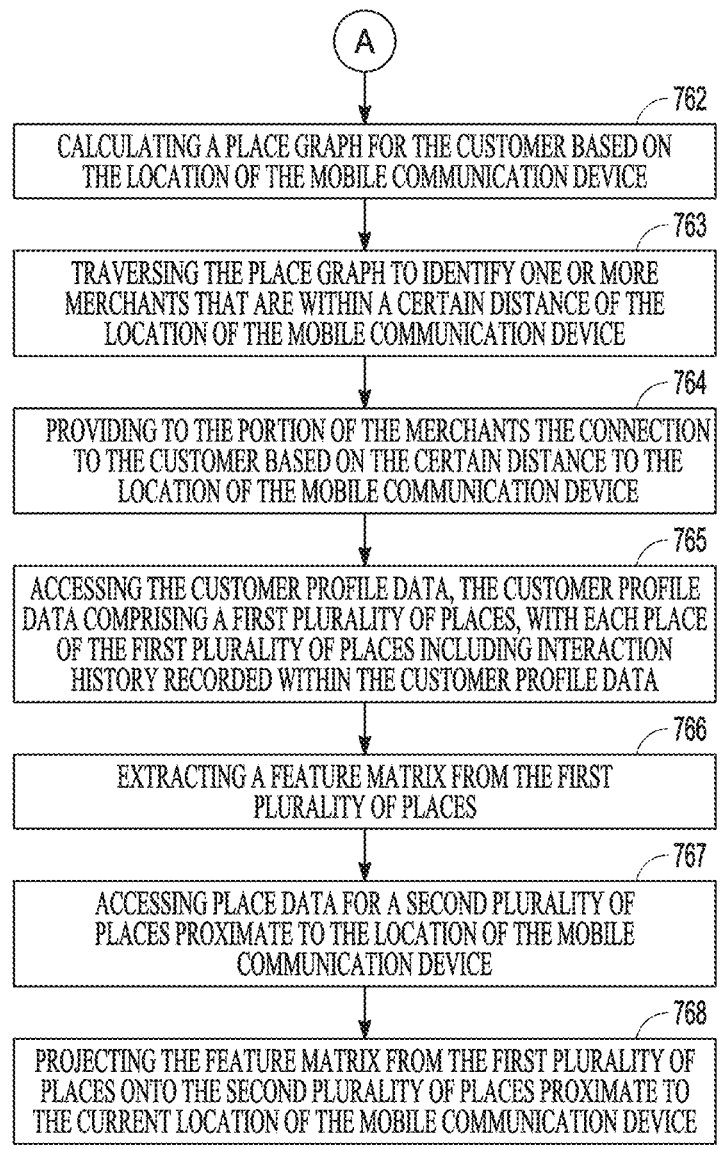
Figure 8:
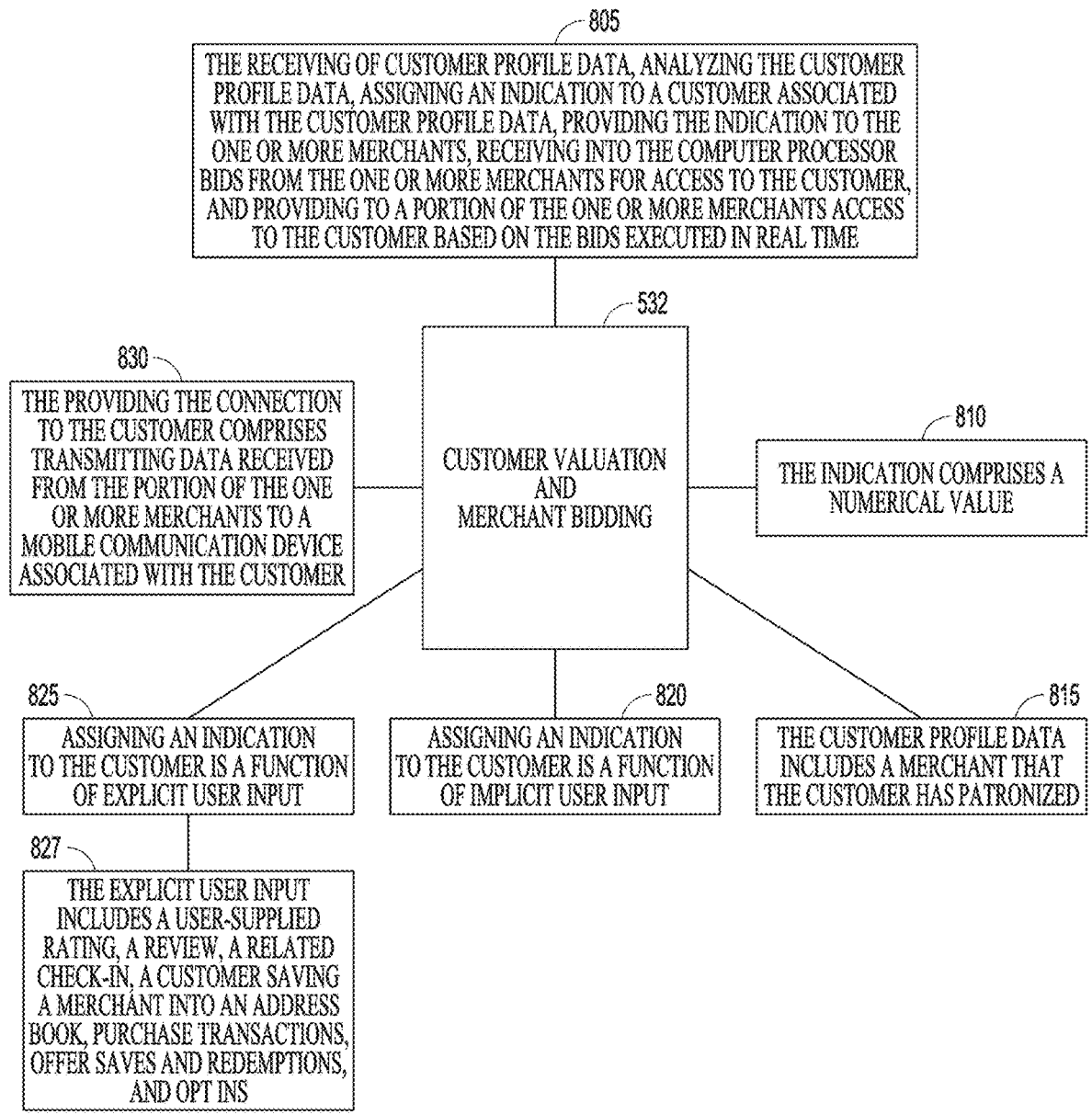
FIG. 8 is a diagram illustrating features of a customer valuation and merchant bidding system and process, according to an example embodiment.

Additional details regarding the functionality provided by the customer valuation and merchant bidding sub-system 532 are detailed in reference to FIGS. 7A, 7B, and 8.

FIGS. 7A and 7B are a flowchart of an example process 700 for generating customer valuations and soliciting and receiving merchant bids for access and/or connections to such customers. FIGS. 7A and 7B include a number of process blocks 705-768. Though arranged serially in the example of FIGS. 7A and 7B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Example Customer Valuation and Merchant Bidding Methods

Referring to FIGS. 7A, 7B, and 8, at 705, customer profile data is received into and/or maintained on mediator system. In an embodiment, the mediator system can be the customer valuation and merchant bidding sub-system 532 of FIG. 5 or 6. The modules and engines of FIG. 6 include one or more computer processors. The mediator system serves as a conduit between a customer and one or more merchants.

At 710, the mediator system analyzes the customer profile data. As noted above, the analysis on the mediator system can involve using algorithms such as a principal component analysis (PCA) or a singular value decomposition (SVD) to extract data and relationships from the data that may not be apparent to a human (such as analyzing a relationship between the type of shoes a person purchases and the type of restaurants that person frequents). Additionally, more direct data relationships can be analyzed, such as determining that a potential customer patronizes a competitor on a regular basis, and determining that such a potential customer is more valuable than other customers. At 715, the mediator system assigns a valuation to the customer based on the analysis of the customer profile data.

At 720, the mediator system provides the indication to one or more merchants. In an embodiment, the merchants subscribe to the customer valuation services of the mediator so that the merchants can receive these customer valuations from the mediator. At 725, the mediator system receives bids from the merchants. The bids from the merchants are based on the value assigned to the customer, and the merchant is bidding on some sort of access or connection to the customer so that the merchant can attempt to influence the customer so that the customer patronizes the merchant's business. At 730, the mediator system provides to one or more of the merchants a connection (e.g., via the customer's mobile device) or other access to the customer so that the merchant can provide a promotion or offering to the customer.

As noted above, there can be a multitude of algorithms that determine a valuation assigned to a customer and a bid value provided by a merchant. Moreover, the mediator system will likely assign different values to a particular customer for several different merchants. For example, when a potential customer who regularly patronizes a competitor of a merchant is currently located within a few blocks of the merchant, the merchant may want a high value applied to that customer, so that the mediator system will generate a respectable bid for access to that customer and the merchant will likely be granted access to that customer. The merchant may further decide that he or she would like an even higher value assigned to that customer during a particular time of the day, such as during the lunch hour or dinner hour. As one of skill in the art will realize, many factors and considerations can go into the valuation of a customer, and the mediation system can be configured to take into account these many factors and considerations when generating a valuation for a customer for any particular merchant.

At 735, the mediator system predicts future purchasing decisions that are likely to be made by the customer. These predictions are based at least in part on the analysis of the customer profile data as described in the previous paragraph. At 740, the predicted future purchasing decisions that are likely to be made by the customer are provided to one or more merchants. At 745, the mediator system receives bids from the merchants. The bids are for access or a connection to the customer, and the bids can be based on the future predicted purchasing decisions likely to be made by the customer. Similar to the embodiment disclosed above wherein merchant bidding on customers is based on customer valuation, many factors and considerations can go into the valuation of such a customer and the decision of a merchant to bid or not to bid on a customer, or the amount to bid, based on the predicted future purchasing decisions likely to be made by the customer. For example, if the mediator system predicts that a customer is likely to purchase leather goods within the next few months because the customer has recently purchased a particular type or make of motorcycle, and a merchant knows from past experience that such predictions are relatively accurate, then the mediator system will assign a higher valuation to that customer, and the merchant may choose to commensurately submit a higher bid for access or a connection to that customer. After the consideration of all the bids submitted by the merchants, at 750, the mediator system provides access or a connection to the customer for one or more of the merchants based on the bids of the merchants.

At 755, the connection to the customer provided by the mediator system based on the bids of the merchants includes first receiving promotions from one or more of the merchants, and then at 757, transmitting the one or more promotions to the customer. At 759, the promotions are transmitted to a computer storage device and/or a computer display device that is associated with the customer, such as a mobile communications device of the customer (e.g., a smart phone or mobile device 400).

At 760, the mediator system's reception and/or analysis of the customer profile data, and the consequent customer valuation, and solicitation and reception of merchant bids, are triggered by a location of a mobile communication device that is associated with the customer. For example, when a customer is within a certain distance of a merchant who is a subscriber to the customer valuation services of the mediator, the mediator will provide a customer valuation to the merchant for the merchant to consider and possibly bid on. Similarly, at 761, the mediator's reception and/or analysis of the customer profile data, and the consequent customer valuation, and solicitation and reception of merchant bids, are triggered by an Internet search by the customer and/or accessing a web site by the customer. Consequently, if a customer accesses the website of a merchant's competitor, or accesses the merchant's website, the mediator can provide a valuation to the merchant for the merchant's consideration.

At 762, the mediator system calculates a place graph for the customer based on the location of the customer's mobile communication device. In an embodiment, the place graph is calculated in real time. At 763, the mediator system traverses the place graph to identify one or more merchants and selects the merchants that are within a certain distance of the location of the customer's mobile communication device. At 764, the mediator system provides to a portion or subset of the one or more merchants the connection to the customer. As noted above, the connection can be based on the distance from the merchant to the location of the customer's mobile communication device.

Figure 9:
FIG. 9 is a table illustrating a set of features for venues within a geographical location, according to an example embodiment.

The calculation of the place graph by the mediator system includes several steps. At 765, the mediator system accesses the customer profile data. The customer profile data can include several places of business, and each of the places of business can include an interaction history that is recorded within the customer profile data. At 766, a feature matrix is extracted from the several places of business. An example of such a feature matrix is illustrated in FIG. 9. At 767, the mediator system accesses place data for another set of businesses. The other set of businesses are normally proximate to the location of the customer's mobile communication device. At 768, the mediator system projects the feature matrix from the first set of places of business onto the second set of places of business proximate to the current location of the customer's mobile communication device. The mediator system can then use the interaction history, the place graph, and the feature matrix to generate a valuation for a particular customer for a particular merchant.

More specifically, in an embodiment, the determination of a location of a customer, the calculation of a place graph, and the use of the place graph by the mediator system functions as follows. The application server 518 receives from a client, such as client 512, location data. In an example, the client 512 is a mobile device, such as mobile device 400, and can provide GPS location data obtained from the GPS receiver

480. The customer valuation and merchant bidding system 532 calculates a place graph for the current user location. In an example, the place graph can include a scored feature matrix (see FIG. 9) projected onto a plurality of places in the current user location. In an example, the location module 620 can provide the plurality of places to the projection module 615 and the projection module 615 can generate the place graph.

The customer valuation engine 620 generates a customer valuation using in part the place graph produced by the place graph module 605. The customer valuation engine 620 can use the place graph to generate the customer valuation by traversing the place graph and extracting places with strong correlation to places within the customer profile data. The customer valuation and merchant bidding sub-system 532 can transmit merchant promotions or other merchant information, via communication channels maintained by the application server 518, to a client device 512.

The calculation of a place graph for the second set of places of business disclosed above can be executed as follows. For example, the customer profile data is accessed, relationships (e.g., features) are extracted, location data is accessed, and the relationships (e.g., features) are projected onto places within a geographic location.

In this example, the process can begin with the place graph module 605 accessing customer profile data to obtain customer interaction data that is associated with the first set of places of business. The customer interaction data that is associated with the first set of places of business can include both explicit and implicit interaction data. As discussed above, explicit interaction data explicitly indicates a customer's preference regarding a place of business (or some aspect of the place). For example, the customer can save a place to a favorites list, thus explicitly indicating that the customer likes the place. The customer could also write a review or take a survey that explicitly indicates that the customer likes the deserts at this particular place of business. Implicit interactions, as discussed above, indirectly indicate a customer's interest in a particular place. For example, if a customer has viewed a detail page for a place of business multiple times, the system may infer that the customer is interested in the location. In an embodiment, implicit interactions are weighted or scored differently than explicit interactions.

The feature extraction module 610 can extract relationships between, or features associated with, the set of places of business. In some examples, the extracted features are scored according to the customer's explicit and implicit interactions. The extracted, and scored, features can create a feature matrix used to describe (or represent) a customer's preferences. In an example, each customer action has a code and a value. When a customer performs an action in association with a place, the code and value associated with the action result in a score associated with the place of business ID and customer ID. This information is fed into a matrix that can be fed into the SVD algorithm for feature extraction. The location module 630 accesses location data, from the database 526, for the above-disclosed second set of places of business within the current geographic location (e.g., the location received as disclosed above). The projection module 615 projects the feature matrix (e.g., extracted relationships between the set of places of business) onto the second set of places of business within the geographic location indicated by the current user location. In this example, the place graph generated can then be used to generate customer valuations in a new geographic location (e.g., a location in which the user has not interacted with any places of business).

As noted above, FIG. 8 illustrates a plurality of corollary features that function in association with the process of FIG. 7. For example, as noted above, and as illustrated at 805, one or more of the steps of the process of FIG. 7 are executed in real time or near real time. Specifically, one or more of the reception of customer profile data, the analysis of the customer profile data, the assignment of an indication to a customer who is associated with the customer profile data, the providing of the indication to the one or more merchants, the reception of the bids from the one or more merchants for access to the customer, and the providing to a portion of the one or more merchants access to the customer based on the bids, are executed in real time.

At 810, the indication is a numerical value. Such a numerical value provides a relatively straightforward means of comparison for a merchant to determine if the merchant would like to bid on access to the customer. For example, a merchant may only want to bid on customers that have a valuation of 80 or more. The mediator system can easily generate a bid for a particular merchant, easily generate such bids for other merchants, and then compare the bids of all the merchants. Different bids can be generated for different merchants at any particular time when any factor changes, such as the location of a customer or the time of day wherein a customer is in a particular location. For example, in one instance a first restaurant may submit a higher bid on a customer because that customer is very close to the first restaurant and it is lunchtime, and the first restaurant values its lunch business more so than its dinner business. In a second instance, a second restaurant may submit the higher bid on that customer because the customer is very close to the second restaurant and it is dinner time, and the second restaurant has a more vibrant dinner business than a lunch business. Any valuation of a customer, such as the example valuation of 80 discussed above, may be based on a possible highest score of 100, or there may be no upper limit to a valuation that a customer can receive.

As noted at 815, the customer profile data can include a merchant that the customer has patronized, a location of the merchant, an identification of goods or services purchased by the customer from the merchant, a cost of the goods and services, a customer-supplied rating of the merchants, and a presence of the merchant in an address book of the customer. One or more of these data, and perhaps additional data, may be used in the calculation of a customer valuation. For example, the mediator system may assign a value of 80, which may be considered a high value in the mediator system, to a customer if that customer has purchased more than $500 from a particular merchant over the last six months.

As noted at 820, the assignment of an indication to the customer can be a function of implicit user input. An example of implicit user input is when a customer searches a website of a particular merchant. This indicates some type of interest in the merchant by the customer, but it is not known whether the interest is positive or negative, or whether the customer has followed up the browsing of the website with a visit to the merchant and/or a purchase from the merchant. At 825, the assignment of an indication to the customer is a function of explicit user input. As noted at 827, examples of explicit user input include a user-supplied rating, a review, a related check-in, and a customer saving a merchant into an address book.

As noted above, and now at 830, the providing of the connection to the customer can include transmitting data received from the portion of the one or more merchants to a mobile communication device associated with the customer.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
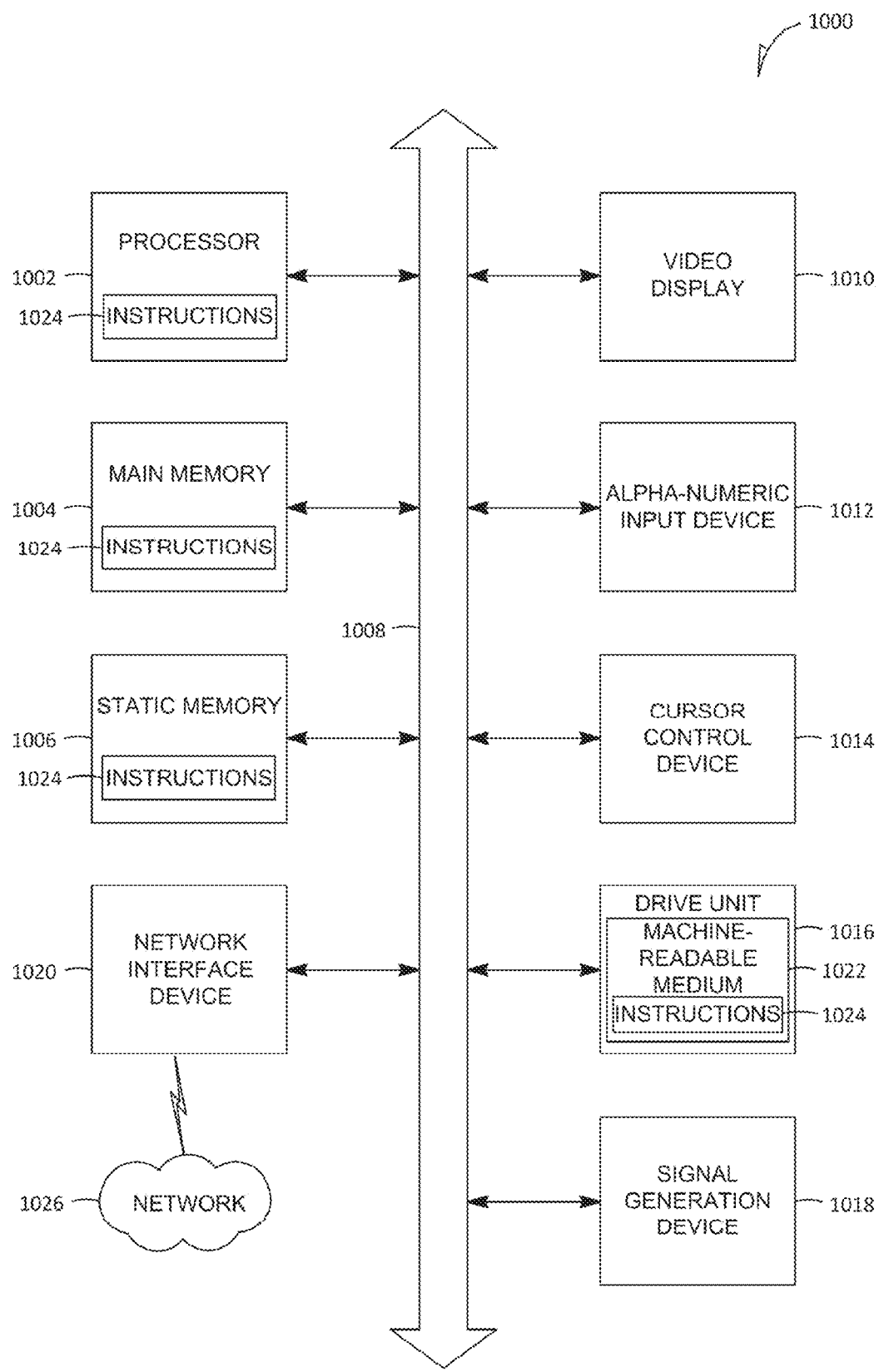
FIG. 10 is a diagrammatic representation of a machine in the example form of a computer system within which a set of instructions for causing the machine to perform any one or more of the methodologies discussed herein may be executed.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for customer valuation and merchant bidding have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method performed by hardware processing circuitry, comprising:
   identifying a location of a mobile device;
   identifying a plurality of merchants within a threshold distance of the location of the mobile device;
   determining different first valuations based on the location, each of the different first valuations determined based on a different respective one of the plurality of merchants and a distance of the mobile device relative to each of the plurality of merchants;
   providing the different first valuations to a first valuation's respective merchant: including a first merchant of the plurality of merchants;
   detecting a change in the location of the mobile device;
   determining different second valuations based on the changed location, each of the different second valuations further based on a different respective one of the plurality of merchants including the first merchant; and
   providing the different second valuations to a second valuation's respective merchant, including the first merchant of the plurality of merchants.

2. The method of claim 1, further comprising:
   receiving a bid from a merchant of the plurality of merchants in response to the second providing;
   selecting a merchant based on the received bid; and
   transmitting data received from the selected merchant to the mobile device.

3. The method of claim 2, further comprising receiving data indicating a promotion from the selected merchant, wherein the transmitting of data received from the selected merchant to the mobile device comprises transmitting the received promotion to the mobile device.

4. The method of claim 1, wherein the determining of the different valuations is based on customer profile data, the customer profile data indicating a merchant preference of a customer associated with the mobile device.

5. The method of claim 4, further comprising:
   determining a feature matrix;
   scoring the feature matrix;
   projecting the scored feature matrix onto a plurality of places within a proximity of the location of the mobile device;
   generating a place graph based on the projected scored feature matrix, wherein the different valuations are determined based on the place graph.

6. The method of claim 5, further comprising traversing the place graph to extract places with strong correlation to places indicated by the customer profile data, wherein the determining of the different valuations is based on the extracted places.

7. The method of claim 4, further comprising:
   predicting a purchase by the customer based on the customer profile data; and
   providing an indication of the predicted purchase to the plurality of merchants.

8. The method of claim 1 wherein the determining of the different valuations is determined at least in part by a time of day.

9. A system, comprising:
   hardware processing circuitry;
   one or more hardware memories storing instructions that when executed configure the hardware processing circuitry to perform operations comprising:
   identifying a location of a mobile device;
   identifying a plurality of merchants within a threshold distance of the location of the mobile device;
   determining different first valuations based on the location, each of the different first valuations determined based on a different respective one of the plurality of merchants and a distance of the mobile device relative to each of the plurality of merchants;
   providing the different first valuations to a first valuation's respective merchant, including a first merchant of the plurality of merchants;
   detecting a change in the location of the mobile device;
   determining different second valuations based on the changed location, each of the different second valuations further based on a different respective one of the plurality of merchants including the first merchant; and
   providing the different second valuations to a second valuation's respective merchant, including the first merchant of the plurality of merchants.

10. The system of claim 9, the operations further comprising:
- receiving a bid from a merchant of the plurality of merchants in response to the second providing;
- selecting a merchant based on the received bid; and
- transmitting data received from the selected merchant to the mobile device.

11. The system of claim 10, the operations further comprising receiving data indicating a promotion from the selected merchant, wherein the transmitting of data received from the selected merchant to the mobile device comprises transmitting the received promotion to the mobile device.

12. The system of claim 9, wherein the determining of the different valuations is based on customer profile data, the customer profile data indicating a merchant preference of a customer associated with the mobile device.

13. The system of claim 12, the operations further comprising:
- determining a feature matrix;
- scoring the feature matrix;
- projecting the scored feature matrix onto a plurality cif places within a proximity of the location of the mobile device; and
- generating a place graph based on the projected scored feature matrix, wherein the different valuations are determined based on the place graph.

14. The system of claim 13, the operations further comprising traversing the place graph to extract places with strong correlation to places indicated by the customer profile data, wherein the determining of the different valuations is based on the extracted places.

15. The system of claim 12, the operations further comprising:
- predicting a purchase by the customer based on the customer profile data; and
- providing an indication of the predicted purchase to the plurality of merchants.

16. The system of claim 9 wherein the determining of the different valuations is determined at least in part by a time of day.

17. A non-transitory computer readable storage medium comprising instructions that when executed configure hardware processing circuitry to perform operations comprising:
- identifying a location of a mobile device;
- identifying a plurality of merchants within a threshold distance of the location of the mobile device;
- determining different first valuations based on the location, each of the different first valuations determined based on a different respective one of the plurality of merchants and a distance of the mobile device relative to each of the plurality of merchants;
- providing the different first valuations to a first valuation's respective merchant, including a first merchant of the plurality of merchants;
- detecting a change in the location of the mobile device;
- determining different second valuations based on the changed location, each of the different second valuations further based on a different respective one of the plurality of merchants including the first merchant; and
- providing the different second valuations to a second valuation's respective merchant, including the first merchant of the plurality of merchants.

18. The non-transitory computer readable storage medium of claim 17, the operations further comprising:
- receiving a bid from a merchant of the plurality of merchants in response to the second providing;
- selecting a merchant based on the received bid; and
- transmitting data received from the selected merchant to the mobile device.

19. The non-transitory computer readable storage medium of claim 18, the operations further comprising receiving data indicating a promotion from the selected merchant, wherein the transmitting of data received from the selected merchant to the mobile device comprises transmitting the received promotion to the mobile device.

20. The non-transitory computer readable storage medium of claim 19, wherein the determining of the different valuations is based on customer profile data; the customer profile data indicating a merchant preference of a customer associated with the mobile device.

* * * * *